United States Patent
Meersseman et al.

(10) Patent No.: US 11,702,849 B2
(45) Date of Patent: Jul. 18, 2023

(54) PANEL AND METHODS FOR MANUFACTURING PANELS

(71) Applicant: FLOORING INDUSTRIES LIMITED, SARL, Bertrange (LU)

(72) Inventors: Laurent Meersseman, Kortrijk (BE); Martin Segaert, Ypres (BE); Bernard Thiers, Beveren-Leie (BE); Benjamin Clement, Waregem (BE); Christophe Maesen, Lichtervelde (BE)

(73) Assignee: Flooring Industries Limited, SARL, Bertrange (LU)

( * ) Notice: Subject to any disclaimer, the term of this patent is extended or adjusted under 35 U.S.C. 154(b) by 105 days.

(21) Appl. No.: 17/235,459

(22) Filed: Apr. 20, 2021

(65) Prior Publication Data

US 2021/0238865 A1    Aug. 5, 2021

Related U.S. Application Data

(63) Continuation of application No. 15/981,756, filed on May 16, 2018, now Pat. No. 11,015,352, which is a
(Continued)

(30) Foreign Application Priority Data

| May 10, 2010 | (BE) | ................................ | 2010/0283 |
| May 27, 2010 | (BE) | ................................ | 2010/0323 |
| Jul. 9, 2010 | (BE) | ................................ | 2010/0420 |
| Nov. 29, 2010 | (BE) | ................................ | 2010/0713 |

(51) Int. Cl.
  *E04F 13/18*    (2006.01)
  *E04F 15/02*    (2006.01)
  (Continued)

(52) U.S. Cl.
  CPC .............. *E04F 15/107* (2013.01); *B27N 7/00* (2013.01); *B32B 3/06* (2013.01); *B32B 5/18* (2013.01); *B32B 7/12* (2013.01); *B32B 21/02* (2013.01); *B32B 21/08* (2013.01); *B32B 27/08* (2013.01); *B32B 27/30* (2013.01); *B32B 27/304* (2013.01); *B32B 27/32* (2013.01); *B32B 27/40* (2013.01); *B32B 37/10* (2013.01); *B32B 37/153* (2013.01); *B44C 1/10* (2013.01); *B44C 5/043* (2013.01); *B44C 5/0476* (2013.01); *E04B 1/54* (2013.01); *E04F 13/0866* (2013.01); *E04F 13/0894* (2013.01); *E04F 13/18* (2013.01); *E04F 15/02* (2013.01); *E04F 15/02022* (2013.01); *E04F 15/02033* (2013.01); *E04F 15/02038* (2013.01); *E04F 15/102* (2013.01); *E04F 15/105* (2013.01); *E04F 15/18* (2013.01); *B32B 38/145* (2013.01); *B32B 2255/10* (2013.01); *B32B 2255/26* (2013.01); *B32B 2260/021* (2013.01); *B32B 2262/067* (2013.01); *B32B 2262/101* (2013.01); *B32B 2266/0235* (2013.01); *B32B 2266/0278* (2013.01); *B32B 2307/412* (2013.01); *B32B 2307/414* (2013.01); *B32B 2307/712* (2013.01); *B32B 2307/718* (2013.01);
  (Continued)

(58) Field of Classification Search
  None
  See application file for complete search history.

(56) References Cited

U.S. PATENT DOCUMENTS

| 1,971,067 | A |  | 8/1934 | Fess |
| 3,498,870 | A |  | 7/1965 | Fritchey |
| 3,383,262 | A |  | 5/1968 | Ettore et al. |
| 4,225,374 | A |  | 9/1980 | Kaufmann |
| 4,654,099 | A | * | 3/1987 | Sandman ................ B32B 37/00 |
|  |  |  |  | 156/87 |
| 4,913,858 | A |  | 4/1990 | Miekka et al. |

(Continued)

FOREIGN PATENT DOCUMENTS

| DE |  | 19532819 A1 | 3/1997 |
| DE |  | 19725829 C1 | 8/1998 |

(Continued)

OTHER PUBLICATIONS

Wen-Hsuan Chang et al., "Advances in Polyurethane Coatings (1969 to Early 1972)", Ind. Eng. Chem. Prod. Res. Develop., vol. 12, No. 4, 1973, pp. 278-288, XP-002617051.
Database WPI, week 199338, Thomson Scientific, London, GB, AN 1993-300138, XP002621436, Aug. 24, 1993.
Database WPI, week 199338, Thomson Scientific, London, GB, AN 1993-300138, XP002622292, Aug. 24, 2993.

*Primary Examiner* — Sheeba Ahmed
(74) *Attorney, Agent, or Firm* — Capitol City TechLaw

(57) ABSTRACT

A method is provided for manufacturing a panel that includes a substrate and a top layer provided on the substrate. The top layer may include a decor film and a transparent film. The decor film may be a printed synthetic material film chosen from the group consisting of a vinyl-based film, a polyethylene based film, a polyurethane based film, and a polypropylene film. A print may be situated on an upper side of the printed synthetic material film. The transparent film may be a thermoplastic synthetic material film the material of which is chosen from the group consisting of polyvinyl chloride, polyethylene, polyurethane, and polypropylene. The method may involve providing the decor film and the transparent film on the substrate by performing a first press treatment at an increased temperature to form a package of the substrate, the decor film, and the transparent film. The first press treatment may be performed by a calendar device or a continuous press device. A structure may be formed in the thermoplastic synthetic material that forms a surface of the package by performing a second press treatment using a press device with a structured press element at a temperature that is lower than the increased temperature.

12 Claims, No Drawings

Related U.S. Application Data continuation of application No. 13/697,078, filed as application No. PCT/IB2011/051885 on Apr. 28, 2011, now abandoned.

(51) Int. Cl.

| | | |
|---|---|---|
| *B44C 1/10* | (2006.01) | |
| *B32B 5/18* | (2006.01) | |
| *B32B 21/08* | (2006.01) | |
| *B32B 27/30* | (2006.01) | |
| *B32B 27/40* | (2006.01) | |
| *B32B 7/12* | (2006.01) | |
| *B32B 21/02* | (2006.01) | |
| *B32B 37/10* | (2006.01) | |
| *B32B 27/32* | (2006.01) | |
| *E04F 15/10* | (2006.01) | |
| *E04F 13/08* | (2006.01) | |
| *B32B 37/15* | (2006.01) | |
| *B44C 5/04* | (2006.01) | |
| *B27N 7/00* | (2006.01) | |
| *B32B 3/06* | (2006.01) | |
| *B32B 27/08* | (2006.01) | |
| *E04B 1/61* | (2006.01) | |
| *E04F 15/18* | (2006.01) | |
| *B32B 38/00* | (2006.01) | |

(52) U.S. Cl.
CPC .............. *B32B 2307/7242* (2013.01); *B32B 2307/732* (2013.01); *B32B 2307/75* (2013.01); *B32B 2309/02* (2013.01); *B32B 2309/105* (2013.01); *B32B 2310/0825* (2013.01); *B32B 2310/0831* (2013.01); *B32B 2317/16* (2013.01); *B32B 2323/04* (2013.01); *B32B 2323/10* (2013.01); *B32B 2327/06* (2013.01); *B32B 2419/04* (2013.01); *B32B 2471/00* (2013.01); *B32B 2479/00* (2013.01); *B32B 2607/00* (2013.01); *E04F 2201/0107* (2013.01); *E04F 2201/0115* (2013.01); *E04F 2201/0123* (2013.01); *E04F 2201/0138* (2013.01); *E04F 2201/0146* (2013.01); *E04F 2201/0153* (2013.01); *E04F 2201/0176* (2013.01); *E04F 2201/023* (2013.01); *E04F 2201/049* (2013.01); *E04F 2201/0523* (2013.01); *E04F 2201/0535* (2013.01); *E04F 2201/0588* (2013.01); *E04F 2201/091* (2013.01); *E04F 2201/095* (2013.01); *E04F 2201/098* (2013.01); *Y10T 428/17* (2015.01); *Y10T 428/195* (2015.01); *Y10T 428/24488* (2015.01); *Y10T 428/24777* (2015.01)

(56) References Cited

U.S. PATENT DOCUMENTS

| | | |
|---|---|---|
| 5,034,084 A | 7/1991 | Schafer et al. |
| 5,344,704 A * | 9/1994 | O'Dell ................ B32B 27/42 428/323 |
| 5,728,476 A | 3/1998 | Harwood et al. |
| 5,952,076 A | 9/1999 | Foster |
| 5,961,903 A | 10/1999 | Eby et al. |
| 5,976,288 A | 11/1999 | Ekendahl |
| 6,287,678 B1 | 9/2001 | Spengler |
| 6,333,094 B1 | 12/2001 | Schneider et al. |
| 6,933,043 B1 | 8/2005 | Son et al. |
| 2002/0009598 A1 | 1/2002 | Lafave et al. |
| 2002/0136862 A1 | 9/2002 | Dong et al. |
| 2004/0031226 A1 | 2/2004 | Miller et al. |
| 2004/0071978 A1 | 4/2004 | Hallenbeck et al. |
| 2004/0255538 A1 | 12/2004 | Ruhdorfer |
| 2005/0025934 A1 | 2/2005 | Thiers |
| 2005/0186393 A1 | 8/2005 | Wilson |
| 2007/0094978 A1 | 5/2007 | Svanholm et al. |
| 2008/0118713 A1 | 5/2008 | Bordener |
| 2008/0138560 A1 | 6/2008 | Windmoller |
| 2008/0152825 A1 | 6/2008 | Mukai et al. |
| 2008/0305312 A1 | 12/2008 | Kim et al. |
| 2009/0031662 A1 | 2/2009 | Chen et al. |
| 2009/0047465 A1 | 2/2009 | Zafiroglu |
| 2014/0255659 A1 * | 9/2014 | Windmoller ............ B32B 27/12 428/221 |
| 2016/0193857 A1 * | 7/2016 | De Mondt ................ E04B 1/54 52/311.1 |

FOREIGN PATENT DOCUMENTS

| | | |
|---|---|---|
| DE | 102004009160 A1 | 9/2005 |
| DE | 202005019427 U1 | 5/2006 |
| EP | 0864712 A2 | 9/1998 |
| EP | 1247641 A1 | 9/2002 |
| EP | 1262607 A1 | 12/2002 |
| EP | 1454763 A2 | 9/2004 |
| EP | 1469140 A1 | 10/2004 |
| EP | 1892352 A2 | 2/2008 |
| EP | 2130991 A2 | 12/2009 |
| FR | 2149112 | 3/1973 |
| FR | 2271365 | 12/1975 |
| FR | 2609664 | 7/1988 |
| GB | 2376916 A | 12/2002 |
| NL | 8000083 | 8/1981 |
| WO | 9747834 | 12/1997 |
| WO | 0109461 A1 | 2/2001 |
| WO | 0148333 A1 | 7/2001 |
| WO | 0196689 A1 | 12/2001 |
| WO | 0200449 A1 | 1/2002 |
| WO | 2004042168 A1 | 5/2004 |
| WO | 2005018833 A1 | 3/2005 |
| WO | 2008091045 A1 | 7/2008 |
| WO | 2010088769 A1 | 8/2010 |

* cited by examiner

PANEL AND METHODS FOR MANUFACTURING PANELS

This application is a continuation application of U.S. patent application Ser. No. 15/981,756 filed May 16, 2018, which is a continuation application of U.S. patent application Ser. No. 13/697,078 filed Nov. 9, 2012, which is a US National Phase Application of International Application No. PCT/IB2011/051885 filed Apr. 28, 2011, the entire contents of all three of which are incorporated herein by reference.

This application claims priority under 35 USC § 119(a)-(d) to Belgian Patent Application Nos. 2010/0283 filed May 10, 2010, 2010/0323 filed May 27, 2010, 2010/0420 filed Jul. 9, 2010, and 2010/0713 filed Nov. 29, 2010, the entire contents of all four of which are incorporated herein by reference.

BACKGROUND

1. Field

This invention relates to panels and methods for manufacturing panels.

More particularly, the invention relates to panels of the type which is at least composed of a substrate and comprises a top layer provided on this substrate, wherein said top layer comprises a printed motif and a transparent or translucent synthetic material layer, which is provided above said printed motif. Herein, this may relate, for example, to furniture panels, ceiling panels, floor panels or the like, which substantially consist of an MDF or HDF (Medium or High Density Fiberboard) basic panel or substrate and a top layer provided thereon. According to a first possibility, it relates to panels obtained by means of a method wherein one or more material layers are provided on the substrate, wherein at least one of these material layers is provided by means of a print which is performed directly on the substrate, wherein this print then forms at least a portion of said printed motif. According to a second possibility, it relates to panels obtained by means of a method wherein one or more material layers are provided on the substrate, wherein at least one of these material layers comprises a printed material sheet, wherein the print of the material sheet then forms at least a portion of said printed motif.

2. Related Art

The panels, manufactured according to said first possibility therefor, are known as such, for example, from U.S. Pat. No. 1,971,067 or DE 195 32 819 A1. From said documents, it is also known that said material layers can comprise one or more primer layers, wherein these primer layers extend substantially underneath said print, and/or can comprise one or more finishing layers, which extend substantially above said print. Such finishing layers can comprise, for example, transparent or translucent synthetic material layers, which form a protective layer above the printed decor and, for example, can comprise wear-resistant particles, such as aluminum oxide. It is not excluded that this protective layer comprises a material sheet, such as a paper sheet.

The state of the art in connection with panels which are provided with a print performed directly on the substrate further becomes clear also from WO 01/48333, WO 02/00449, WO 2004/042168, EP 1 454 763, DE 197 25 829 01 and DE 10 2004 009 160 A1.

It is known, amongst others, from WO 01/48333, that for realizing said material layers either lacquers or synthetic resins can be applied. In the case of synthetic resins, those are applied via a carrier sheet, which beforehand is provided with such synthetic resin and, by means of a heated press, is provided on the substrate. In the case of lacquers, for example, UV-hardening lacquers can be applied. Respectively, also wear-resistant particles are applied for obtaining a sufficient wear resistance on the surface of the panel. Such wear-resistant particles, however, lead to a reduced transparency of the material layer concerned.

It is known, amongst others, from DE 197 25 829 C1 or EP 1 454 763, that one or more synthetic resins, applied in liquid condition, can be used for realizing said material layers. After these resin layers have dried, they are hardened in a heated press. By means of such method, paper-free top layers can be realized. According to the state of the art, an adherence of synthetic resins is only possible on water-based inks. However, the water-based inks are less resistant against UV radiation, for example, as a consequence of sunlight, than UV-based inks.

Panels manufactured according to said second possibility therefor are known, for example, from WO 97/47834 and WO 01/96689. Such panels typically comprise a top layer provided above the substrate and being on the basis of thermo-hardening resin, wherein this top layer is composed, by means of a press treatment, of paper sheets provided with resin. One of these paper sheets usually is provided with a printed motif, whereas another paper sheet is transparent and serves as a protective layer for this printed motif. During said press treatment, also a relief can be realized in the surface of said transparent or translucent layer.

SUMMARY

The present invention, according to its different independent aspects, in first instance aims at providing alternative panels and methods, which, according to various preferred embodiments thereof, can be realized more smoothly and/or economically than the methods of the state of the art. The panels of the invention, according to different embodiments thereof, also show mechanical or optical features which mean a progress in respect to the panels known from the state of the art. For example, panels can be obtained which lead to a more acceptable sound when they are used as floor panels, and/or to a more agreeable, warmer feeling.

DESCRIPTION OF NON-LIMITING EMBODIMENTS

To this aim, the invention, according to its first independent aspect, relates to a panel of the type which comprises at least a substrate and a top layer provided on this substrate, wherein said top layer comprises a motif printed directly on the substrate and a transparent or translucent synthetic material layer, which is provided above said printed motif, with the characteristic that said transparent or translucent synthetic material layer comprises vinyl and that a primer is provided between the printed motif and the vinyl-containing synthetic material layer. Preferably, said translucent synthetic material layer substantially consists of vinyl and/or plasticizer. In that vinyl is applied on the surface, an agreeable feeling is created on the surface of the panels. Said primer allows obtaining in an economic manner an adherence of the vinyl-containing synthetic material layer on an underlying layer, for example, on the inks of the printed motif. The inventors have found that such adherence can be obtained on UV-bases inks as well as on water-based inks.

Preferably, there are no further substances and/or layers between the inks of the printed motif and the vinyl-containing synthetic material layer.

Preferably, the vinyl-containing synthetic material layer has a thickness of at least 0.2 millimeters or more. The inventors have found that such thickness of the synthetic material layer allows already obtaining an acceptable wear resistance, even when the panel of the invention should be applied as a floor panel. Moreover, such layer has a good transparency. With such thickness of the vinyl-containing synthetic material layer, the use of wear-resistant particles, such as aluminum oxide particles, which usually are applied in floor panels, can be omitted in this layer. Such wear-resistant particles have a negative influence on the transparency of the synthetic material layer, and restricting the amount of such particles leads to a better rendition of said printed motif. Preferably, in the case that wear-resistant particles are applied, less than 10 or still better less than 5 grams per square meter of such particles are applied. Of course, the invention as such does not exclude that a larger amount of such particles should be applied in the vinyl-containing synthetic material layer.

Preferably, the thickness of said vinyl-containing synthetic material layer is less than 1 millimeter. Such thickness leads to a very wear-resistant surface layer, which in most cases will be sufficient and still is sufficiently transparent.

A very interesting value for the thickness of said vinyl-containing top layer, which offers an optimum between cost price and wear resistance, is in the range of 0.25 to 0.5 millimeters. With such thickness, additional wear-resistant particles are not necessary.

It is noted that according to the invention, still one or more further layers can be provide above said vinyl-containing synthetic material layer. The common thickness of these further layers preferably is smaller, and still better is at least 5 times smaller than the thickness of the vinyl-containing synthetic material layer. Said further layers may comprise, for example, UV-hardened layers, which can lead, for example, to an increased resistance against the development of black stripes rubbed off by shoe soles. It is not excluded that said one or more further layers comprise wear-resistant particles, which result in an increased scratch resistance. Herein, this may relate, for example, to aluminum oxide or silicon oxide particles having an average diameter which is smaller than 60 micrometers and still better smaller than 10 micrometers. It is also not excluded that these further layers are free from such wear-resistant particles or at least comprise less than 10 grams or less than 5 grams per square meter of such particles.

Preferably, a primer is applied which comprises a polymer with aliphatic character or substantially is based on such polymer. The inventors have found that polymers with aliphatic character, compared to polymers with aromatic character, are much less inclined to yellowing and thus can guarantee a better transparency of said vinyl-containing synthetic material layer. Of course, it is not excluded that within the idea of the invention still a primer on the basis of aromatic polymers might be used. In such case, preferably also UV blockers and/or whiteners are applied in the primer and/or in the vinyl-containing synthetic material layer situated there above. As a whitener, for example, a substance can be applied which comprises a derivate of a distyryl biphenyl compound.

Preferably, said primer comprises polyurethane and/or polyisocyanurate, or the primer is based on one or both of these polymers. As aforementioned, this preferably relates to the aliphatic variant of these agents. The inventor has found that polyurethane or polyisocyanurate realizes in an economic manner a good adherence between a vinyl-containing synthetic material layer and the inks of a printed motif. This may relate, for example, to UV-based inks or water-based inks.

Preferably, said transparent or translucent synthetic material layer is free from material sheets, such as paper sheets or synthetic material sheets or films. Such sheets have a negative influence on the transparency of the respective layer; moreover, they involve an extra cost.

As aforementioned, said transparent or translucent synthetic material layer preferably is free from additives which increase the wear resistance of the panel, or at least it comprises less than 10 grams per square meter of such additives.

Said vinyl, which at least partially forms the transparent or translucent synthetic material layer, preferably relates substantially polyvinyl dichloride (PVdC). Generally, PVdC is more expensive than PVC (Polyvinyl chloride), but has lower water permeability. Water resistance is a desired feature for many decorative surfaces, such as for floor panels or furniture panels. The invention does not exclude that use could be made of vinyl which substantially relates to polyvinyl chloride.

According to a variant, a more environmentally-friendly panel can be obtained when said vinyl at least partially and preferably substantially or exclusively relates to a chlorine-free vinyl compound, preferably chosen from the list of polyvinyl butyrate, polyvinyl alcohol and vinyl acetate, such as EVA (Ethylene vinyl acetate).

Preferably, said vinyl-containing synthetic material layer, and still better the entire top layer, is free from plasticizers or contains maximum 35 parts by weight of plasticizer per 100 parts by weight of vinyl compound, or still better less than 20 parts by weight. Restricting the plasticizer contents results in a sturdier surface having a better impact resistance. Moreover, omitting plasticizers to a large extent is interesting when manufacturing such panels, as the risk of the development of harmful materials, for example, vapors, is restricted in this manner. When plasticizer is applied, for example, phthalate-based plasticizers can be chosen, such as DINP (di-isononyl phthalate). Preferably, in such case, however, it is opted for plasticizers on the basis of isosorbide. These last-mentioned plasticizers are more environmentally-friendly.

According to a deviating variant, said synthetic material layer comprises polyurethane instead of vinyl, wherein this polyurethane preferably is aliphatic, and wherein this preferably relates to so-called polyester-based thermoplastic polyurethane. The inventors have found that the use of such synthetic material layer results in obtaining a good scratch resistance on the surface of the panels. Moreover, polyurethane shows a better resistance against staining by shoe soles than vinyl. Thus, an additional UV-based surface layer for restricting or counteracting this phenomenon is redundant in the case of a polyurethane-containing surface layer. Preferably, the polyurethane synthetic material layer thus forms a transparent or translucent layer, which is present on the actual surface of the panel. Preferably, the thermoplastic polyurethane layer or film has a thickness situated between 0.1 and 0.3 mm, or a plurality of such layers or films have a common thickness situated between 0.1 and 0.3 mm. Such thickness suffices for obtaining a wear resistance which is acceptable for floor panels. Of course, thicker layers are not excluded, as they can lead to a still higher wear resistance. The inventors have found that a thickness of 0.15 mm allows obtaining a Taber IP value (EN 13329) of 3000 or more. This value can even be obtained when the synthetic material layer is free from additional wear-resistant particles. When an aromatic polyurethane is applied, preferably also use is made of a UV blocker or whitener, such as a substance which comprises a derivate of a distyryl biphenyl compound. The inventors have also found that for performing press treatments on a polyurethane-containing synthetic material layer, for example, with a metal press platen, no additional measures have to be taken for detaching the press platen and the synthetic material layer. It is clear that the remaining preferred embodiments of the first aspect of the invention, mutatis mutandis, can be applied in combination with a polyurethane-containing synthetic material layer.

It is noted that the above deviating variant generally is considered a particular, independent aspect of the invention, which can also be defined as a panel of the type which comprises at least a substrate and a top layer provided on this substrate, wherein said top layer comprises a printed motif and a transparent or translucent synthetic material layer, which is provided above said printed motif, with the characteristic that said transparent or translucent synthetic material layer comprises polyurethane. It is clear that herein the printed motif, as in the first aspect, can be formed directly on the substrate, or can be provided on a carrier material, such as a paper sheet or a synthetic material film, preferably a polyurethane film. Further, it is clear that according to this particular independent aspect not necessarily use is made of a primer.

Preferably, said motif is provided directly on the substrate, by the intermediary of one or more primer layers. The use of primer layers is known as such from the patent documents mentioned in the introduction. Preferably, said primer layers are based on UV lacquers, synthetic resins, such as melamine formaldehyde resin and/or vinyl. In the last case, vinyl compounds mentioned above, whether or not chlorine-free, can also be applied. Preferably, by means of said primer layers, a printing background of uniform or practically uniform color is obtained.

Preferably, said motif is printed by means of UV-based inks. Such inks have a good UV stability. Moreover, the primer and the vinyl-containing synthetic material layer allow applying such UV inks.

According to the first aspect of the invention, said vinyl-containing synthetic material layer preferably is provided on the panel as a liquid or paste-like substance, which, after being applied, is dried or hardened, for example, by means of ovens, presses or lamps, for example, infrared lamps. For drying or hardening, also the heat of heated elements can be used, wherein this heat then is supplied to said liquid substance, whether or not directly. For example, to this aim the panel can be conveyed over one or more heated rollers. Preferably, the liquid or paste-like substance relates to a so-called plastisol, which comprises at least a vinyl compound suspended in a plasticizer, preferably PVC. The plasticizer relates, for example, to a phthalate compound, such as di-isononyl phthalate (DINP) and can form 50 percent by weight or more of the suspension or paste.

Applying said liquid or paste-like substance can be performed, for example, by providing it directly on the printed substrate, for example, by means of a spreading device. According to another possibility hereof, the liquid substance or paste first is provided on a carrier material and then transferred onto the printed substrate, wherein said carrier material can or can not be transferred along. When the carrier material is transferred along onto the substrate and is kept there in the final panel, which is not necessary, this preferably relates to a carrier material which is or becomes transparent or translucent. For example, use can be made of a transparent or translucent synthetic material film, for example, on the basis of a vinyl compound, such as PVC.

As an alternative, said vinyl-containing layer or a portion thereof also can be applied as one or more vinyl-containing synthetic material films. According to the also above-mentioned deviating variant, also the polyurethane or a portion thereof can be provided on the substrate as one or more films. It is clear that this alternative and this deviating variant can be combined with a portion of the synthetic material layer which is applied in liquid form.

According to a preferred embodiment of the invention, the panel of the invention comprises a relief on the surface thereof, wherein this relief extends in the vinyl-containing synthetic material layer; however, preferably the recesses of said relief are only so deep that they do not penetrate in said printed pattern. For providing such relief, use can be made of any technique. Preferably, use is made of a technique wherein the structure of a structured press element is copied into the surface of the vinyl-containing synthetic material layer, for example, by means of a press treatment. Preferably, said synthetic material layer is heated prior to and/or during the press treatment. By the heating of the synthetic material layer, the synthetic material layer preferably is made softer, by which the press treatment can be realized at a lower pressure. In the case of preceding heating, preferably use is made of a radiation source, such as an infrared radiator. In the case that heating is performed during the press treatment, then heating is performed preferably by means of thermal oil with which the press device and the press element are warmed up. Preferably, said synthetic material layer is forcedly cooled during pressing and/or thereafter. By cooling, the structure on the surface of the synthetic material layer will be conserved better. Preferably, during the press treatment a temperature of 130° C. or more is achieved. For said cooling, either use can be made of the same press treatment, or use can be made of a separate treatment and press device, which then preferably is not heated or even is cooled. It is also possible that the above-mentioned structured press element is applied only during this cooling, and/or that in such case during the first press treatment solely an adherence between the different layers of the panel is obtained. Said cooling implies that the consolidated panel is still warm from the first press treatment and/or is re-heated before it is subjected to the second press treatment.

Preferably, an opening and closing discontinuous press or a so-called short-cycle press is applied, wherein per cycle each time one package of a substrate, printed motif and synthetic material layer is pressed. It is also possible to work with so-called multiple-opening presses, wherein then a plurality of packages can be pressed per cycle.

According to a second independent aspect, the invention relates to a panel of the type which comprises at least a substrate and a top layer provided on said substrate, wherein said top layer comprises a vinyl-based synthetic material layer, characterized in that said substrate preferably is a wood-containing or wood-based substrate and that a primer is provided between the substrate and said vinyl-based synthetic material layer. Preferably, no further substances or layers are situated between the substrate and said primer and/or between said primer and said vinyl-based synthetic material layer.

Preferably, as a primer a polyurethane-containing substance is applied, such as a polyurethane-based dispersion glue. Preferably, this primer provides for the binding between said synthetic material layer and the substrate, and still better no further binding agents are present for this purpose.

Preferably, said vinyl-based synthetic material layer relates to a vinyl film, for example, a PVC film. Herein, this may relate to a decor film, which shows a printed pattern. It may also relate to a transparent film or possibly to a colored film. Preferably, said vinyl-based synthetic material layer relates at least to a decor film, which is printed by means of solvent inks. With solvent inks, a very high printing quality can be achieved. According to a deviating variant of the second aspect, use is made of a polyurethane-containing synthetic material layer, such as a thermoplastic polyurethane film. To this aim, preferably the materials are applied which are mentioned in the deviating particular aspect of the first aspect. Of course, also the preferred embodiments of the second aspect can be performed by means of such polyurethane-containing synthetic material layer instead of a vinyl-containing synthetic material layer.

According to a particular embodiment, said vinyl-based synthetic material layer comprises a transparent or translucent vinyl-base film as a decor film on the basis of vinyl, wherein said transparent or translucent vinyl-based film is provided above said decor film.

According to another particular embodiment, said vinyl-based synthetic material layer comprises a decor film on the basis of vinyl, as well as a transparent or translucent vinyl-based layer, which is free from films and other sheets. This transparent or translucent layer can be obtained as described by means of the first aspect of the invention, for example, by means of applying the liquid substances or pastes mentioned there.

It is clear that also according to this second independent aspect, the surface of the panel, more particularly the vinyl-based synthetic material layer, can be provided with a relief in any manner. Preferably, one or more of the possibilities therefor set forth in the first aspect can be applied for this purpose.

According to a third independent aspect, the present invention relates to a method for manufacturing a panel, wherein this panel is of the type which comprises at least a substrate and a top layer provided on this substrate, with the characteristic that the method comprises at least the following steps:

the step of preparing the substrate;
the step of performing a print on the substrate;
the step of providing a primer on the print; and
the step of providing a vinyl- or polyurethane-containing material on the substrate.

The vinyl- or polyurethane-containing material, which according to the third aspect is provided on the substrate, can be situated anywhere in the final top layer of the panel. For example, it may form part of a layer which serves as a primer layer for the print, and/or form part of a transparent or translucent synthetic material layer, which is situated above the print. Preferably, the vinyl- or polyurethane-containing material is situated at least in said transparent or translucent synthetic material layer, and said primer realizes at least partially the bond between the print and this transparent or translucent synthetic material layer.

Said step of preparing the substrate can imply, for example, a grinding treatment and/or providing one or more primer layers. Said primer layers preferably consist of lacquers or synthetic resins, by which preferably at least a uniform printing background is realized.

Said primer layers preferably are applied in liquid or viscous form, for example, as a paste, and dried. To this aim, preferably one or more roller devices, respectively ovens or other heating devices are applied.

As aforementioned, said primer layers may also comprise vinyl-containing materials and consist, for example, substantially of the possibilities, mentioned in the first aspect, for the material of the vinyl-containing synthetic material layer, wherein they then do not necessarily have to result in a transparent or translucent layer, however, preferably result in a uniform, for example, white or beige printing background.

As a primer preferably any of the primers described by means of the first aspect is applied. For the vinyl-containing material, preferably the materials are applied which are named in the first aspect as possibilities for the transparent or translucent synthetic material layer.

Said step of performing a print preferably is performed by means of a digital printing device, for example, by means of an inkjet printer. Herein, preferably UV-based inks are applied. Of course, water-based inks or solvent inks are not excluded.

It is clear that the method of the third aspect is intended in particular for manufacturing the panels of the first aspect or the mentioned there deviating variant or particular aspect of the first aspect, and that preferred embodiments of these aspects or variants lead to corresponding preferred embodiments of the third aspect.

According to a fourth independent aspect, the invention also relates to a method for manufacturing a panel, wherein this panel is of the type which comprises at least a substrate and a top layer provided on this substrate, wherein said top layer comprises at least a synthetic material film, with the characteristic that the method comprises at least the step of providing said film on the substrate by means of a press treatment at increased temperature. The aim of the press treatment can be twofold. This aim may namely comprise applying the film on the substrate and providing a structure in the surface of the top layer.

Preferably, the method of the fourth aspect further also comprises at least the step of providing a primer on the substrate, preferably a polyurethane dispersion glue.

It is clear that the method of the fourth aspect is intended in particular for manufacturing the panels of the second aspect and that preferred embodiments of the second aspect lead to corresponding preferred embodiments of the fourth aspect.

As synthetic material film, preferably use is made of a PVC film or a thermoplastic polyurethane film. This film either can be printed and form the possible printed motif of the panel, or can be made transparent or translucent and in this manner form a protective layer above such possible motif. In the case of polyurethane, preferably the aliphatic variant is used, or an aromatic variant, which then preferably contains UV blockers and/or whitener. For examples of whiteners, reference is made to the above-mentioned aspects and variants, where the respective materials mentioned there can be taken over for being applied in this fourth aspect.

Preferably, said substrate relates to a wood-containing or wood-based substrate, such as MDF or HDF or wood particle board. According to a variant, said substrate comprises a foamed synthetic material, such as foamed polyethylene or foamed polyvinyl chloride.

Generally, said substrate preferably relates to a porous substrate, such as it is the case with the aforementioned substrates. By means of such substrate, a good resistance against delamination, or, in other words, against a separation of the top layer, can be achieved. In principle, it suffices when the surfaces of said substrate, which is provided with the top layer, is porous. However, it is not excluded that the entire substrate is made porous.

Preferably, said top layer comprises at least two synthetic material films, for example, a decor film and a transparent film. Possibly, herein this may relate to airtight films. In that case, preferably measures are taken against the occurrence of air inclusions between both synthetic material films. For example, one or both of the synthetic material films can be made perforated, such that possibly accumulated air can escape along these perforations.

Preferably, the method of the fourth aspect comprises a step which is performed prior to the step of the press treatment, wherein in this preceding step, said two synthetic material films are laminated to a composed film. In this manner, the logistics of the method are simplified. In the case of airtight films, in this manner any air inclusions are avoided already prior to the press treatment. Preferably, laminating is performed by means of a calendering device or another device, in which rollers are applied. By means of rollers, the air can be expelled gradually from in between said synthetic material films.

According to a particular embodiment, the top layer comprises at least a paper sheet, which, prior to the press treatment, is provided with thermoplastic synthetic material, such as PVC, polyisocyanate or polyurethane, and at least a synthetic material film, such as a thermoplastic polyurethane film or a PVC film, wherein then at least the substrate, said paper sheet and said synthetic material sheet are bonded to each other by means of the press treatment of the fourth aspect. Preferably, said paper sheet relates to a printed paper sheet, wherein the print provides for a printed motif in the top layer of the panel. In such case, the synthetic material film preferably forms a protective layer above the printed motif. The paper sheet and the synthetic material film preferably are adhered to each other in a separate treatment step by means of a calendering device or another device in which rollers are applied. This separate treatment step preferably is performed prior to the press treatment.

Preferably, said press treatment is performed at a temperature situated between 80° C. and 150° C., or still better between 110° C. and 140° C. Such temperature is sufficient for achieving an adherence of the synthetic material films over the primer with the substrate. Preferably, an opening and closing discontinuous press or a so-called short-cycle press is applied, wherein per cycle respectively one package of a substrate and one or more synthetic material films are pressed. It is also possible to work with so-called multiple-opening presses, wherein then a plurality of packages per cycle can be pressed.

Preferably, said press treatment is performed with a pressing time which is shorter than one minute. The inventors have found that such pressing time is sufficient for achieving a good adherence. At the same time, it is possible to provide, by means of the press treatment, a structure in the surface of the panel, in particular in said synthetic material film. According to a preferred embodiment, it is started from at least one flat, unstructured synthetic material film, preferably a transparent or translucent synthetic material film, which in said press treatment is adhered on the substrate and is provided with a structure as well. For realizing said structure, during the press treatment preferably use is made of a structured press element, for example, a structured press platen or press plate. Preferably, said structure is performed in accordance with a printed motif, for example, the motif of the possible decor film. Preferably, the structure is obtained in a press treatment performed in an opening and closing press. Preferably, said press element is provided with a coating, which promotes detaching the press element from the panel.

For the quality of the obtained structure, it can be desirable that said package is cooled down under pressure. To this aim, either use can be made of the same press treatment in which the top layer is adhered to the substrate, or use can be made of a separate press device, which then preferably is not heated or possibly even is cooled. It is also possible that the above-mentioned structured press element is applied only during this cooling down, and/or that in such case during the first press treatment only an adherence between the different layers of said package is obtained. Said cooling down implies that the consolidated package still is warm from the first press treatment and/or is heated up again before being subjected to the second press treatment.

This last possibility as such forms an application of a broader inventive concept of the invention, which will be set forth below as a second particular, independent aspect.

According to this second particular, independent aspect, the present invention relates to a particular combination for the above-mentioned possibilities of the fourth aspect, wherein not necessarily all essential parts of the method of the fourth aspect have to be applied. To this aim, the invention relates to a method for manufacturing a panel, wherein this panel is of the type which comprises at least a substrate and a top layer provided on this substrate, wherein said top layer comprises thermoplastic synthetic material, with the characteristic that the method comprises at least a first step, wherein said thermoplastic synthetic material is subjected to a first temperature and a first pressure, and comprises at least a second step, wherein in this thermoplastic synthetic material a structure is formed and the thermoplastic synthetic material is subjected to a second temperature and a second pressure, wherein said first temperature is higher than said second temperature and said second pressure preferably is higher than said first pressure.

The inventors have found that forming a structure at a lower temperature, after the thermoplastic synthetic material has been subjected to a heat treatment on a lower pressure, leads to a better rendition and keeping of the provided structure.

For the motif, preferably use is made of a printed synthetic material film, such as a printed vinyl-based film, or a printed polypropylene film, or a printed polyethylene film, or a printed polyurethane film. The print preferably is situated on the upper side of this film, however, it is not excluded that it might be provided at least partially on the lower side of the film, wherein the actual film then is made transparent or translucent and possibly forms said thermoplastic synthetic material or a portion thereof. Preferably, the connection between the printed synthetic material film and the substrate is obtained at least by the intermediary of an adhesive layer, preferably by the intermediary of a polyurethane dispersion glue. According to an alternative, for the motif use is made of a motif, printed directly on the substrate, which is similar to the directly printed motifs which are described in the context of the first aspect; namely, similar inks and/or similar primer layers can be applied.

Preferably, said thermoplastic synthetic material, when performing said second step, forms the surface of a consolidated package, which comprises at least the substrate, the motif and the thermoplastic synthetic material. According to an alternative, said thermoplastic synthetic material in this stage of the method is finished further with one or more layers provided there above, which comprise, for example, UV-hardening or hardened layers. To this aim, the substances of the UV-hardening or hardened layers mentioned in the context of the first aspect can be applied, whether or not in the amounts mentioned there and/or with the wear-resistant particles mentioned there. In any case, the thermoplastic synthetic material preferably relates to a layer of transparent or translucent thermoplastic synthetic material, which is applied above the motif in any manner, either as a synthetic material film, or as a liquid substance or paste. As a material for the thermoplastic synthetic material, it may be opted for vinyl-based synthetic material, such as PVC, or for polypropylene, polyurethane or polyethylene.

In the case that for the motif as well as for the transparent or translucent layer use is made of a film, these are laminated onto each other preferably at least prior to said second step, for example, to form a composed film or a consolidated package, which comprises at least the laminated films and moreover, for example, also comprises the substrate. Laminating can be performed by means of a calender device, for example, as described in the context of the fourth aspect of the invention.

Preferably, prior to said first step and/or in connection with said first step a consolidated package is formed, which comprises at least said motif and said thermoplastic synthetic material. Preferably, such consolidated package at least is available prior to said second step. Possibly, this consolidated package further can also comprise the substrate and/or a thermoplastic back layer on the lower side of the motif or the printed synthetic material film. It is possible that herein a method with the characteristics of the fourth aspect is applied. According to another possibility, a calender device or a continuous press device is applied for bringing together the two or more layers of the consolidated package.

According to still another possibility, for example, at least the thermoplastic synthetic material is realized by applying a liquid substance or paste on the substrate and/or the motif. In this last case, said thermoplastic synthetic material can be performed free from films or other sheets. To this aim, a method can be applied similar to the one described in the context of the third aspect and/or the fifth aspect, wherein then possibly instead of a motif printed directly on the substrate, a printed synthetic material film is used, which is bonded to the substrate or a possible back layer in the also above-mentioned manners. Preferably, the adherence between the motif and the thermoplastic top layer is obtained by means of the material of this motif, or the possible printed synthetic material film and the thermoplastic layer itself, thus, without the intermediary of external glue layers.

In the case that the top layer includes a back layer, which is not necessarily the case, preferably a back layer is used which consists of PVC or another thermoplastic synthetic material, preferably recycled PVC, and preferably is filled with chalk. Such back layer preferably forms at least 30% and still better at least 45% of the thickness of the top layer.

The aforementioned first temperature and first pressure to which said thermoplastic synthetic material is subjected, can, as aforementioned, be created by forming the consolidated package of at least motif and thermoplastic synthetic material, for example, by means of a calender device or a continuous press device. According to another possibility, those are generated by means of a heating device, such as by means of a radiation source, preferably an infrared lamp. In this last case, it is clear that the first pressure can be equal to atmospheric pressure. The first temperature preferably is higher than room temperature (23° C.) and, for example, is at least 50 percent and still better more than 80 percent or more of the glass transition temperature (Tg), expressed in degrees Celsius, of the respective thermoplastic synthetic material. Of course, the first temperature may also be higher than the glass transition temperature, preferably, however, more than 150 percent thereof. In this suggested range of the first temperature, an ideal suitable softness of the thermoplastic synthetic material is achieved for proceeding to said second step. Preferably, said second step is performed without forcedly cooling the thermoplastic synthetic material in between and/or without applying a period of rest. Preferably, the thermoplastic synthetic material, at the beginning of the second step, has at least 80 percent of the temperature which this synthetic material had at the end of the first step, and in any case at least a temperature which is higher than room temperature.

Said second temperature and second pressure to which said thermoplastic synthetic material is subjected, can be generated by means of a press treatment with a structured press element, similar to the press treatments described in the context of the first aspect or the fourth aspect of the invention. Preferably, however, an opening and closing discontinuous press device or a so-called short-cycle press is applied, which comprises a structured press plate or press platen. Preferably, in the second step a cooling down under pressure of the thermoplastic top layer is achieved, whereas at the same time a relief is realized in the surface of the thermoplastic synthetic material and/or the consolidated package. Preferably, the press device, including the press platen, is kept on a temperature which is lower than the temperature of the thermoplastic synthetic material at the beginning of said second step. Preferably, at the press device, including the press platen, no heat is supplied except the possible heat of the thermoplastic synthetic material itself. Said second temperature preferably is between 20 and 55° C. or less than 50 percent of the glass transition temperature of the respective thermoplastic synthetic material. Said second pressure preferably is between 1 and 10 bar. The inventors have found that short pressing times can be handled, for example, pressing times of less than a minute, such as between 5 and 50 seconds or even between 5 and 25 seconds. Preferably, a structure in accordance with the motif is obtained.

Preferably, in said second step, compared to said first step, a separate device is applied.

According to a first important example of said second particular aspect, prior to the first step a composition is formed, which comprises an MDF substrate, a back layer provided on the upper side of the substrate, and a backing layer or underlying layer provided on the lower side of the substrate. This composition is obtained by gluing the underlying layer and back layer to the substrate by means of a polyurethane-based glue, such as a polyurethane dispersion glue. Subsequently, a printed synthetic material film and a transparent or translucent thermoplastic film, such as a PVC film, is placed on the composition, more particularly on the side thereof which comprises the back layer. This package is consolidated in a first step by means of a heated press device, for example, a continuously working press device. During this press treatment, said first temperature and first pressure are achieved. Herein, consolidation takes place in that the initial composition and the synthetic material films melt together at the locations where they are adjacent to each other. In a second step, the still warm consolidated package is supplied to an unheated short-cycle press, which comprises a structured press element. After a pressing time of 15 seconds, a structured panel is obtained. As the short-cycle press is unheated, the second temperature can be kept lower than the first temperature in a simple manner. However, preferably the second pressure is higher than the first pressure.

According to a second important example of said second particular aspect, prior to the first step a composition is formed comprising an MDF substrate and a backing layer or underlying layer provided on the lower side of the substrate. This composition is obtained by providing the underlying layer as a liquid or paste-like substance on the substance and hardening or drying it there. The upper side of the substrate is spread with glue, such as with polyurethane-based glue, for example, with polyurethane dispersion glue. Subsequently, a printed synthetic material film and a transparent or translucent thermoplastic film, such as a PVC film, is placed on the composition, more particularly on the side thereof which comprises the glue. In a first step, this package is consolidated by means of a heated press device, for example, a continuously working press device. During this press treatment, said first temperature and first pressure are achieved. Herein, the consolidation takes place in that the initial composition and the printed film are glued to each other and at the same time the synthetic material films mutually melt together at the locations where they are adjacent to each other. In a second step, the still warm consolidated package is supplied to an unheated short-cycle press, which comprises a structured press element. After a pressing time of 15 seconds, a structured panel is obtained. As the short-cycle press is unheated, the second temperature can be kept lower than the first temperature in a simple manner. However, preferably the second pressure is higher than the first pressure.

According to a third important example of said second particular aspect, prior to the first step a composition is formed comprising an MDF substrate and a backing layer or underlying layer provided on the lower side of the substrate. This composition is obtained by providing the underlying layer as a liquid or paste-like substance on the substance and hardening or drying it there. The upper side of the substrate is spread with glue, such as with polyurethane-based glue, for example, with polyurethane dispersion glue. Prior to the first step, also a composed film is formed on the basis of a printed synthetic material film and thermoplastic synthetic material, for example, also in the form of a film. This composition can be performed by laminating both, or by providing the thermoplastic synthetic material in a liquid or paste-like form on the printed synthetic material. Subsequently, the composed film is placed on the substrate, more particularly on the side thereof which comprises the glue. This package is consolidated by reaction of the glue. In a first step, the consolidated package is heated by means of an infrared radiation device. During this heating step, said first temperature and first pressure are achieved. In this case, the first pressure is equal to the atmospheric pressure. In a second step, the still warm consolidated package is supplied to an unheated short-cycle press, which comprises a structured press element. After a pressing time of 15 seconds, a structured panel is obtained. As the short-cycle press is unheated, the second temperature can be kept lower than the first temperature in a simple manner. However, in this case preferably the second pressure clearly is higher than the atmospheric pressure.

It is clear that the panels from the first through the third example can be subjected to still other treatments before the final floor panels are obtained. For example, the panel can also be divided into a plurality of smaller panels having approximately the dimensions of the final floor panels.

It is noted that by means of the second particular aspect a very good correspondence between structure and motif can be obtained. According to the state of the art, which substantially applied continuous press devices and/or multiple-opening presses, up to now such correspondence is unattained. Preferably, said structure is realized exclusively by means of said second step and thus, at the beginning of the second step, the thermoplastic synthetic material is still free from relief or any structure.

It is clear that the second particular aspect can be applied, for example, for manufacturing panels with the characteristics of the first or the second aspect of the invention.

According to a fifth independent aspect, the invention also relates to a method for manufacturing a panel, wherein this panel is of the type which comprises at least a substrate and a top layer provided on this substrate, wherein said top layer comprises at least a printed motif and a transparent or translucent synthetic material layer provided there above, with the characteristic that the method comprises at least the step of providing, above the printed motif, a vinyl-containing paste in order to form at least a portion of said transparent or translucent synthetic material layer, and of providing, by means of a press treatment, a relief in said transparent or translucent synthetic material layer. Preferably, the paste applied herein relates to a so-called plastisol or a suspension of PVC in plasticizer. It is clear that for this purpose, the pastes mentioned in other aspects can be applied.

According to a preferred embodiment, said paste is provided over a synthetic material film or synthetic material layer, which is provided with said printed motif. Preferably, herein this relates to a printed PVC or polyurethane film. In the case of a polyurethane film, this preferably relates to a thermoplastic polyurethane film of the aliphatic type or of the aromatic type, wherein in this last case preferably also UV blockers and/or plasticizers are applied in the top layer, preferably at least on a location where these UV blockers or whiteners are situated in and/or above this film. For examples of thermoplastic polyurethane films and whiteners, reference is made to the other aspects. The print preferably is performed by means of solvent inks. According to another possibility, UV-based inks can be applied.

According to a first particular embodiment of the above preferred embodiment, the synthetic material layer, over which, according to the fifth aspect, the paste is provided, comprises at least a back layer and a synthetic material film, wherein the printed motif is provided on the synthetic material film, and wherein said back layer and printed synthetic material film preferably are provided over one another prior to the step of providing the paste. Said back layer preferably consists of PVC, preferably recycled PVC, and preferably is filled with chalk. Such back layer forms preferably at least 30% and still better at least 45% of the thickness of the top layer. Preferably, the layer obtained by means of the paste forms at least 10 percent and still better at least 15 percent of the thickness of the top layer. A good thickness for this layer is a thickness of 0.2 millimeters or more. Preferably, the thickness of this layer is less than 0.5 millimeters.

According to another, second particular embodiment of the above preferred embodiment, which possibly can be combined with said first particular embodiment, the synthetic material film over which the paste is applied is web-shaped. The application of the paste then preferably is performed continuously, whereas the synthetic material film, for example, is supplied from a roll. In such case, said press treatment possibly can be performed by means of a continuous press device. Preferably, the web, which is provided with the paste, however, is divided into sheets, which then in this form are subjected to the press treatment. In this last case then preferably use is made of the also above-mentioned opening and closing press devices.

The overall thickness of the top layer preferably is between 1 and 3 millimeters, and still better between 1.5 and 2.5 millimeters.

The layer, which is realized by means of the paste, preferably is free from wear-resistant particles, such as aluminum oxide. When such particles are present nevertheless, they preferably have a concentration of less than 10, and still better of less than 5 grams per square meter.

Preferably, the top layer, or the portion thereof which comprises the printed motif, is provided on the substrate after said paste is provided above the printed motif. This results in a smoother process. The press treatment of the fifth aspect, which forms the relief, preferably is performed after the substrate and the synthetic material film provided with the paste already have been brought together. Preferably, the top layer is adhered to the substrate by means of a press treatment, which does or does not correspond to the press treatment which realizes the relief. According to an alternative, the press treatment of the fifth aspect, which forms the relief, is performed before the substrate and the synthetic material film provided with paste are brought together, or anyhow at least before they are adhered to each other. In this last case, the adherence can be obtained by a press treatment and/or by a glue connection. Preferably, however, use is made of an adherence by means of the materials of the top layer and the substrate themselves, thus, without the intermediary of external glue layers.

Preferably, said paste, prior to the press treatment, is at least partially hardened or gelled. It is clear that this hardening takes place while the paste already is provided on said motif.

Preferably, by means of said press treatment also heat is supplied to said transparent or translucent layer, which possibly comprises not yet hardened paste. The step of hardening or gelling thus possibly can be obtained at least partially by means of the press treatment of the fifth aspect. When the paste before the start of the press treatment is at least partially or even completely gelled, it is possible that by means of the heat of the press treatment this hardening is at least partially reversed again, or that, in other words, the transparent or translucent synthetic material film is softened again.

Preferably, said transparent or translucent layer is formed substantially by means of said paste. Possibly, on the surface of the panel also one or more further layers, for example, UV-hardened layers, can be applied, of a similar type as explained by means of the first aspect.

According to a sixth aspect, the invention also relates to a panel of the type which comprises at least a substrate and a top layer provided on this substrate, wherein said top layer comprises a printed motif, a paper sheet and a transparent or translucent synthetic material layer, with the characteristic that said paper sheet is provided with thermoplastic synthetic material and that said transparent or translucent synthetic material layer comprises thermoplastic synthetic material. It is clear that said transparent or translucent synthetic material layer herein preferably is situated above the printed motif. Reference is made, amongst others, to the also above-mentioned particular embodiment of the fourth aspect, which shows an example of the invention according to this sixth aspect.

The synthetic material which is applied on the paper sheet preferably relates to a polyurethane or a polyisocyanate. Preferably, the synthetic material is provided by soaking the paper sheet in such synthetic material or by impregnating it therewith in another manner. The paper sheet, which, according to the invention, is provided with the thermoplastic synthetic material, preferably relates to a printed paper sheet, which represents said printed motif. According to an alternative, the paper sheet can also be a transparent paper sheet, which is provided above said printed motif as a protective layer. In such case, the printed motif either can be provided on a separate material sheet, or can be printed directly on the substrate, whether or not by the intermediary of primer layers.

The synthetic material of said transparent or translucent synthetic material layer preferably relates to a vinyl compound or a polyurethane. Preferably, a thermoplastic polyurethane film is applied, for example, of the types also mentioned in the preceding aspects.

Preferably, the paper sheet, provided with the synthetic material, and the transparent or translucent synthetic material layer are provided on the substrate by means of a calendering device.

According to a seventh aspect, the present invention also relates to a panel of the type which comprises at least a substrate and a top layer provided on this substrate, wherein said top layer comprises a printed motif and a transparent or translucent synthetic material layer, which is provided above said printed motif, with the characteristic that the top layer is composed of at least one layer which comprises a thermo-hardening synthetic resin, and at least one layer which comprises a thermoplastic synthetic resin.

As a thermo-hardening synthetic resin, use can be made of polycondensation resins, such as melamine resins. As a thermoplastic synthetic resin, use can be made of a vinyl compound or a polyurethane.

Preferably, the layer which relates to the thermo-hardening resin, relates to a decor paper which is provided of such resin. Herein, the decor paper then comprises at least a portion of said printed motif. Preferably, the layer with the thermo-hardening resin is situated immediately against the substrate. By means of this thermo-hardening resin, the bond with the substrate may be obtained, namely, preferably without external glue connections.

Preferably, the layer which comprises the thermoplastic synthetic material, relates at least to a transparent or translucent layer, which is applied above the printed motif and thus preferably above the layer with the thermo-hardening resin. In this manner, a surface layer with particular features can be obtained. When said layer with thermoplastic synthetic material has a thickness situated between 0.1 millimeter and 0.5 millimeters, even without additional wear-resistant particles a wear resistance can be obtained which is acceptable for floor coverings or floor panels. For a good quality, a thickness of 0.25 to 0.4 is desirable. Of course, it is not excluded that such layer should be made thicker than 0.5 millimeters.

According to a first possibility, the layer which comprises the thermoplastic synthetic material can be applied at least partially as a liquid or paste-like substance. To this aim, reference is made to the examples in other aspects. According to a second possibility, the layer which comprises the thermoplastic synthetic material can at last partially be provided as a material sheet provided with such synthetic material, for example, a paper sheet. To this aim, reference is made to the examples in other aspects, in particular of the sixth aspect. According to a third possibility, the layer which comprises the thermoplastic synthetic material can at least partially be provided as a synthetic material film, for example, a PVC film or a polyurethane film. To this aim, reference is made to the examples of such films in other aspects.

According to all aspects, preferably a porous substrate is applied, such as a wood-based substrate. The substrate may relate, for example, to a MDF or HDF (Medium Density Fiberboard or High Density Fiberboard) or a wood particle board. Other possible substrates are substrates which comprise foamed material, such as a substrate which comprises foamed polyethylene or polyvinyl chloride. Preferably, the substrate has a density of less than 800 kilograms per cubic meter and still better of less than 500 kilograms per cubic meter, wherein these lowest densities preferably are achieved by means of said substrates which contain foamed material.

According to all aspects, the present invention relates to floor panels or other panels which as such are rigid and thus as such can not be wound up. Preferably, the final panel has a thickness of more than 5 millimeters, however, preferably less than 15 millimeters. A good value for the thickness is 7 to 10 millimeters. Such panels are very suitable for providing mechanical coupling means thereon, which allow connecting two or more of such panels at their edges to each other. Preferably, herein use is made of mechanical coupling means, such as of the type known from WO 97/47834.

Where, according to all aspects and variants, calendering or calender devices are mentioned, a device is intended where two layers are adhered to each other at least by means of rollers, and preferably by supplying heat.

It is clear that, when, according to all aspects and variants, a synthetic material film is mentioned, it is intended that this film essentially consists of synthetic material and thus is free from other materials, such as paper.

Further, it is clear that, when hardening or gelling of a liquid substance or paste is mentioned, at least a viscosity increase of such substance or paste is indicated. In the case of a vinyl- or PVC-containing paste, apart from PVC powder preferably at least 5 to 75 percent by weight of plasticizer is used and after hardening, so-called soft PVC is obtained. Preferably, such PVC paste, apart from PVC powder and plasticizer, contains also 3 to 15 percent by weight of wax, such as polyethylene wax or montane ester wax.

The step of hardening or gelling can be performed in several substeps, wherein each time heat is supplied to the paste, for example, directly or indirectly by means of infrared lamps or by means of heated elements, which are directly or indirectly in contact with the paste. Preferably, the temperatures applied on the surface of the paste herein are between 40° C. and 200° C. and still better between 110° C. and 175° C.

Further, it is also noted that in the methods of the invention one may possibly start from manufacturing larger boards, from which then by subdividing, for example, by means of a sawing treatment, a plurality of panels, such as floor panels, can be obtained. This dividing step can take place anytime, and it is not necessary that all essential steps of the respective independent aspects of the invention already have been performed before such subdividing takes place. Namely, one or more partial steps can be performed on the smaller panels.

Further, it is noted that the characteristics of said aspects can be combined, inasmuch as they are not contradictory.

The present invention is in no way limited to the herein above-described embodiments; on the contrary, such methods and panels can be realized according to various variants without leaving the scope of the present invention.

What is claimed is:

1. A method for manufacturing a panel that includes a substrate and a top layer provided on the substrate, wherein the top layer includes a decor film and a transparent film, wherein the decor film is a printed synthetic material film chosen from the group consisting of a vinyl-based film, a polyethylene based film, a polyurethane based film, and a polypropylene film, with a print being situated on an upper side of the printed synthetic material film, and wherein the transparent film is a thermoplastic synthetic material film the material of which is chosen from the group consisting of polyvinyl chloride, polyethylene, polyurethane, and polypropylene, the method comprising:

providing the decor film and the transparent film on the substrate by performing a first press treatment at an increased temperature to form a package of the substrate, the decor film, and the transparent film;

wherein the first press treatment is performed by a calendar device or a continuous press device; and forming a structure in the thermoplastic synthetic material that forms a surface of the package by performing a second press treatment using a press device with a structured press element at a temperature that is lower than the increased temperature.

2. The method according to claim 1, further comprising providing a primer on the substrate.

3. The method according to claim 1, wherein the substrate is wood-containing or wood-based.

4. The method according to claim 1, wherein the substrate comprises a foamed synthetic material.

5. The method according to claim 1, wherein no heat is supplied to the press device with the structured press element.

6. The method according to claim 1, wherein prior to the first press treatment, laminating together the decor film and the transparent film to form a composed film.

7. The method according to claim 1, wherein the first press treatment is performed at a temperature between 80 and 150° C.

8. The method according to claim 1, wherein the first press treatment is performed with a pressing time shorter than one minute.

9. The method according to claim 1, wherein the thermoplastic material forming the surface of the package is structured exclusively by the second press treatment.

10. The method according to claim 1, wherein the decor film is a polyvinyl chloride film.

11. The method according to claim 1, wherein a surface of the substrate that is provided with the top layer is porous.

12. The method according to claim 1, wherein the material of the transparent film is polyvinyl chloride.

* * * * *